United States Patent Office 3,030,404
Patented Apr. 17, 1962

3,030,404
THIOPHOSPHORIC ACID ESTERS AND PROCESS FOR PRODUCING THEM
Gerhard Schrader, Wuppertal-Cronenberg, Germany, assignor to Farbenfabriken Bayer Aktiengesellschaft, Leverkusen, Germany, a corporation of Germany
No Drawing. Filed June 11, 1957, Ser. No. 664,919
Claims priority, application Germany June 29, 1956
4 Claims. (Cl. 260—461)

The present invention relates to and has as its objects new and useful thiophosphoric acid esters as well as their preparation. Generally these new esters correspond to the following formula

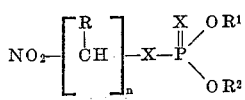

wherein $n$ stands for a whole number up to 4, R stands for hydrogen or a lower alkyl radical, X stands for oxygen or sulfur, at least one X being sulfur, and $R^1$ and $R^2$ stand for lower alkyl radicals.

Many thio- and dithiophosphoric acid esters have become known and important insecticides and plant protecting agents recently. A special class of compounds in the group of phosphorus insecticides includes such compounds which have in one of their alkyl ester groups a substituent such as a mercapto group, an amino group, a hydroxy group and the like.

It has now been found that a new and useful class of phosphorus insecticides of the above shown formula may be obtained either by reacting nitroalkanols with O.O-dialkylthionophosphoric acid halides or by reacting nitroalkyl halides with O.O-dialkylthio- or dithiophosphoric acid salts. The two types of reactions may be demonstrated by the following Equations A and B, in which nitroethanol or nitroethyl chloride or the O.O-diethylthiophosphoric acid chloride or O.O-diethylthio- or dithiophosphoric acid sodium salt are used.

(A)

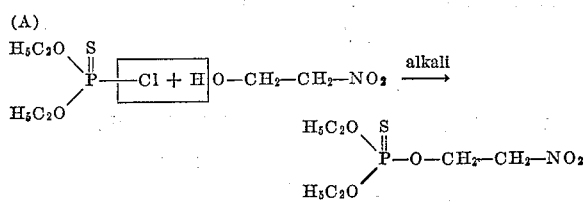

(B)

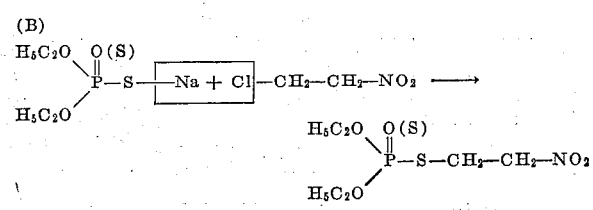

In case A the reaction generally may be carried out in the presence of an inert solvent such as benzene, toluene, lower aliphatic liquid hydrocarbons and the like. The presence of an acid-binding agent is advisable and mostly necessary. Such acid-binding agents may be either alkali methyl hydroxides or alcoholates or even better tert.-organic amines such as pyridine, triethyl amine and the like. Generally the reaction should be carried out at temperatures from about 0° C. to about 100° C., especially at about room temperature to slightly elevated temperatures, say about 60 to 70° C. The reaction according to A may also be performed as a 2-step reaction, namely by condensing at first an O.O-dialkylphosphite halogenide with the corresponding nitroalkanol and then reacting the intermediate phosphite with sulfur. This reaction may be shown by the following scheme $A_1$ $(A_1)$

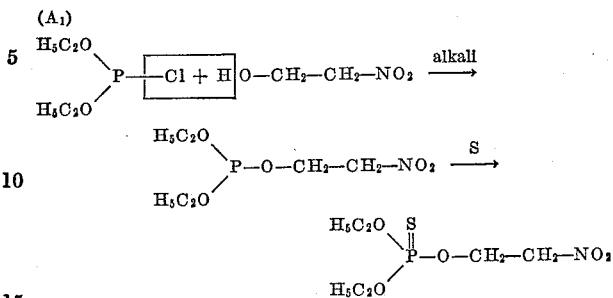

When according to B thiol- or thionothiol nitroalkyl esters should be prepared the reaction also should be carried out in inert organic solvents. The optional solvents in this case are lower aliphatic alcohols such as ethanol or methanol or lower aliphatic ketones such as acetone or methylethyl ketone. The reaction also proceeds at slightly elevated temperatures, say about 60 to 70° C. to yield optionally the inventive compounds. Especially ammonium salts of thiol- or thionothiol phosphoric acid esters are used for the reaction, but also other salts such as the sodium or potassium salt may be used advantageously.

The compounds of the present invention are generally valuable insecticides and plant-protecting agents. They kill pests such as aphids, flies and mites and exhibit a very remarkable systemic action. The application of these compounds should be carried out according to the use of other known phosphor insecticides, i.e. in dilution or solution with solid or liquid carriers such as chalk, talc, bentonite, water, alcohols, liquid hydrocarbons, etc. The inventive compounds may further be used in combination with other known insecticides or pesticides, etc. Effective concentrations of the compounds may vary also; generally concentrations of 0.0001% to 1.0% kill pests effectively. The combinations of the compounds may be sprayed or dusted or otherwise brought in contact with pests or plants to be protected. They may also be used as aerosols.

The utility of the inventive compounds especially has been proven by testing O-($\beta$-nitroethyl)-O.O-diethylthiono phosphate against flies, black bean aphids and spider mites. Aqueous solutions of a concentration of 0.01 or 0.1% active ingredient have been prepared by adding the same amount of acetone to the above said active ester, then adding 50% by weight of a commercial emulsifier based on benzyl-hydroxy-diphenyl-polyglycol ether, and then diluting this mixture to the above said concentration. Flies are killed completely with 0.01% solutions and black bean aphids and spider mites with such ones containing 0.1% of active ingredient.

The following examples are given by way of illustration only, without limiting the present invention thereto.

*Example 1*

48 grams of $\beta$-nitroethylalcohol (B.P.$_1$ 72° C.) are dissolved in 200 cc. of toluene, 42 grams of pyridine and 100 cc. of methylethyl ketone. While stirring and conducting nitrogen through the reaction tube there is added a solution of 80 grams of diethyl phosphorus acid monochloride in 50 cc. of toluene at a temperature of about 25° C. The reaction is exothermic. The intermediate phosphorus acid ester is not going to be isolated, but there are added immediately to the reaction product 16 grams of sulfur. The temperature then rises to about 70° C. This temperature is kept while stirring for another hour. Then the reaction product is cooled to room temperature and washed with 100 cc. of ice water, which contains 20 cc. of diluted hydrochloric acid. The toluene layer is separated and washed once again with 50 cc. of water, then it is dried and fractionated. There are obtained 88 grams of the crude ester of the formula $$\begin{array}{c} C_2H_5O \\ \phantom{C_2H_5O} \diagdown \\ \phantom{C_2H_5O} P-O-CH_2-CH_2-NO_2 \\ \phantom{C_2H_5O} \diagup \\ C_2H_5O \end{array} \;\; \overset{S}{\underset{\|}{}}$$

as a yellow, very little water-soluble oil (B.P.$_{0.01}$ 87° C.). The oil shows a LD$_{50}$ of 250 mg./kg. on rats orally.

By the same way but using dimethyl phosphorus acid chloride in the equivalent amount there is obtained the ester of the formula $$\begin{array}{c} CH_3O \\ \diagdown \\ P-O-CH_2-CH_2-NO_2 \\ \diagup \\ CH_3O \end{array} \;\; \overset{S}{\underset{\|}{}}$$

Example 2

33 grams of β-nitroethylchloride (B.P.$_1$ 40° C.) are dissolved in 50 cc. of alcohol together with 57 grams of the ammonium salt of diethylthiol phosphoric acid at a temperature of about 60° C. After a short period ammonium chloride separates. The temperature is kept at 60° C. for another half an hour, and then it is cooled to room temperature. The reaction product is poured into 100 cc. of water. The separated oil is taken up in chloroform, washed with water and dried over sodium sulfate. After removing the chloroform there are obtained 60 grams of the new ester of the formula $$\begin{array}{c} C_2H_5O \\ \diagdown \\ P-S-CH_2-CH_2-NO_2 \\ \diagup \\ C_2H_5O \end{array} \;\; \overset{O}{\underset{\|}{}}$$

(B.P.$_{0.01}$ 105° C.). The oily new ester is only little water soluble and slightly yellowish; it shows a LD$_{50}$ of 100 mg./kg. on rats orally.

By the same way but using the equivalent amount of the ammonium salt of 0.0-dimethyl- or -dipropylthiol phosphoric acid there are obtained the compounds of the following formulae $$\begin{array}{c} CH_3O \\ \diagdown \\ P-S-CH_2-CH_2-NO_2 \\ \diagup \\ CH_3O \end{array} \;\; \overset{O}{\underset{\|}{}}$$

and $$\begin{array}{c} C_3H_7O \\ \diagdown \\ P-S-CH_2-CH_2-NO_2 \\ \diagup \\ C_3H_7O \end{array} \;\; \overset{O}{\underset{\|}{}}$$

Example 3

61 grams of diethyldithiophosphoric acid ammonium salt are dissolved in 60 cc. of methylethyl ketone. While stirring there are added 33 grams of β-nitroethyl chloride. The temperature is kept at 60° C. for another half an hour and then the mixture is worked up as described in the foregoing example. There are obtained 65 grams of the crude ester of the formula $$\begin{array}{c} C_2H_5O \\ \diagdown \\ P-S-CH_2-CH_2-NO_2 \\ \diagup \\ C_2H_5O \end{array} \;\; \overset{S}{\underset{\|}{}}$$

which shows a LD$_{50}$ of 250 mg./kg. on rats orally (B.P.$_{0.01}$ 98° C.).

By the same way there is obtained from the ammonium salt of O.O-dimethyldithio phosphoric acid the following compound $$\begin{array}{c} CH_3O \\ \diagdown \\ P-S-CH_2-CH_2-NO_2 \\ \diagup \\ CH_3O \end{array} \;\; \overset{S}{\underset{\|}{}}$$

Example 4

53 grams of nitroisopropyl alcohol of the formula $$\begin{array}{c} HO-CH-CH_2-NO_2 \\ | \\ CH_3 \end{array}$$

(B.P.$_1$ 62° C.) are dissolved in 150 cc. of toluene together with 42 grams of pyridine. While conducting nitrogen through the reaction tube there is added a solution of 80 grams of diethylphosphoric acid monochloride in 80 cc. of toluene at a temperature of about 30° C. The reaction is exothermic. Without further isolation of the intermediate there are added 16 grams of sulfur. The temperature then rises to 85° C. This temperature is kept for another half an hour. Then the reaction product is poured into 150 cc. of ice water, which contains 20 cc. of diluted hydrochloric acid. The toluene layer is separated and shaken once again with 50 cc. of water, then the layers are separated and the organic layer is dried over sodium sulfate. After removing the toluene in vacuo there are obtained 65 grams of the crude ester of the formula $$\begin{array}{c} C_2H_5O \\ \diagdown \\ P-O-CH-CH_2-NO_2 \\ \diagup \;\;\;\;\;\;\; | \\ C_2H_5O \;\;\;\;\;\; CH_3 \end{array} \;\; \overset{S}{\underset{\|}{}}$$

as a yellow water soluble oil (B.P.$_{0.01}$ 85° C.).

I claim:

1. A compound of the formula $$\begin{array}{c} C_2H_5O \\ \diagdown \\ P-O-CH_2-CH_2-NO_2 \\ \diagup \\ C_2H_5O \end{array} \;\; \overset{S}{\underset{\|}{}}$$

2. A compound of the formula $$\begin{array}{c} C_2H_5O \\ \diagdown \\ P-S-CH_2-CH_2-NO_2 \\ \diagup \\ C_2H_5O \end{array} \;\; \overset{O}{\underset{\|}{}}$$

3. A compound of the formula $$\begin{array}{c} CH_3O \\ \diagdown \\ P-S-CH_2-CH_2-NO_2 \\ \diagup \\ CH_3O \end{array} \;\; \overset{O}{\underset{\|}{}}$$

4. A thiophosphoric acid ester of the formula $$\begin{array}{c} \;\;\;\;\;\;\;\;\;\;\;\;\;\;\;\;\;\; X \;\;\; OR^1 \\ \;\;\;\;\;\;\;\;\;\;\;\;\;\;\;\;\;\; \| \;\; / \\ NO_2-CH_2-CH-X-P \\ \;\;\;\;\;\;\;\;\;\;\;\;\;\; | \;\;\;\;\;\;\;\; \diagdown \\ \;\;\;\;\;\;\;\;\;\;\;\;\;\; R \;\;\;\;\;\;\;\;\; OR^2 \end{array}$$

in which $R^1$ and $R^2$ each stand for a member selected from the group consisting of methyl and ethyl, R stands for a member selected from the group consisting of hydrogen and methyl, and X stands for a member selected from a group consisting of oxygen and sulfur, one X being sulfur and the other X being oxygen.

References Cited in the file of this patent

UNITED STATES PATENTS

| | | |
|---|---|---|
| 2,494,126 | Hoegberg | Jan. 10, 1950 |
| 2,908,604 | Godfrey et al. | Oct. 13, 1959 |
| 2,979,522 | Johnston et al. | Apr. 11, 1961 |

FOREIGN PATENTS

| | | |
|---|---|---|
| 969,440 | France | Dec. 20, 1950 |